United States Patent
Ray et al.

(10) Patent No.: US 8,295,801 B2
(45) Date of Patent: Oct. 23, 2012

(54) SYSTEM AND METHOD FOR IDENTIFYING AND COLLECTING DATA MESSAGES BEING COMMUNICATED OVER A COMMUNICATIONS NETWORK

(75) Inventors: Amar Nath Ray, Shawnee, KS (US); Robert J. Morrill, Overland Park, KS (US); Lynn T. Greene, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 460 days.

(21) Appl. No.: 12/272,238

(22) Filed: Nov. 17, 2008

(65) Prior Publication Data

US 2010/0003955 A1 Jan. 7, 2010

Related U.S. Application Data (60) Provisional application No. 61/078,123, filed on Jul. 3, 2008.

(51) Int. Cl.
*H04W 4/22* (2009.01)
(52) U.S. Cl. ............ 455/404.1; 455/414.1; 370/312
(58) Field of Classification Search .......... 370/312; 455/404.1, 404.2, 414.1, 414.2, 456.1, 456.2, 455/456.3, 456.6
See application file for complete search history.

(56) References Cited

U.S. PATENT DOCUMENTS

| | | | |
|---|---|---|---|
| 5,339,351 A | 8/1994 | Hoskinson et al. |
| 5,379,337 A | 1/1995 | Castillo et al. |
| 5,497,149 A | 3/1996 | Fast |
| 5,555,286 A | 9/1996 | Tendler |
| 5,646,987 A | 7/1997 | Gerber et al. |
| 5,937,038 A | 8/1999 | Bell et al. |
| 6,137,877 A | 10/2000 | Robin et al. |
| 6,240,285 B1 | 5/2001 | Blum et al. |
| 6,317,049 B1 | 11/2001 | Toubia et al. |
| 6,366,772 B1 | 4/2002 | Arnson |
| 6,415,018 B1 | 7/2002 | Antonucci et al. |
| 6,480,578 B1 | 11/2002 | Allport |
| 6,526,125 B1 | 2/2003 | Lindsay et al. |
| 6,591,112 B1 | 7/2003 | Siccardo et al. |
| 6,642,844 B2 | 11/2003 | Montague |
| 6,678,357 B2 | 1/2004 | Stumer et al. |
| 6,690,932 B1 | 2/2004 | Barnier et al. |

(Continued)

OTHER PUBLICATIONS

Non-Final Office Action date mailed Aug. 3, 2010 for U.S. Appl. No. 11/891,784.

(Continued)

*Primary Examiner* — Ajit Patel
*Assistant Examiner* — Myron K Wyche
(74) *Attorney, Agent, or Firm* — Swanson & Bratschun, L.L.C.

(57) ABSTRACT

A system and method for capturing emergency data messages in a network environment includes receiving, at a first network node, an emergency data message communicated from a wireless communications device. The emergency data message may be accompanied by an origination address and destination address indicative of an emergency network address. A determination may be made at the first network node to determine whether the origination address matches a monitored address established by a law enforcement agency to capture data messages to or from the origination address. If it is determined that the origination address matches the monitored address, then a copy of the emergency data message may be routed to a second network node for collection of the emergency data message and the emergency data message may be routed to the destination address. Otherwise, the emergency data message may be routed to the destination address.

20 Claims, 3 Drawing Sheets

U.S. PATENT DOCUMENTS

| | | | |
|---|---|---|---|
| 7,026,925 | B2 | 4/2006 | Roche et al. |
| 7,079,627 | B2 | 7/2006 | Crago et al. |
| 7,095,733 | B1 | 8/2006 | Yarlagadda et al. |
| 7,098,787 | B2 | 8/2006 | Miller |
| 7,231,218 | B2* | 6/2007 | Diacakis et al. ........... 455/456.1 |
| 7,269,413 | B2 | 9/2007 | Kraft |
| 7,386,103 | B1 | 6/2008 | Chahal |
| 7,418,087 | B2 | 8/2008 | Luneau et al. |
| 7,496,189 | B2 | 2/2009 | Clarisse et al. |
| 7,679,605 | B2 | 3/2010 | Vallaire |
| 7,706,356 | B1 | 4/2010 | Olshansky et al. |
| 7,734,019 | B1 | 6/2010 | Terpstra |
| 7,773,975 | B2 | 8/2010 | Snapp et al. |
| 7,920,679 | B1 | 4/2011 | Naim et al. |
| 8,014,341 | B1 | 9/2011 | Ray |
| 8,102,986 | B1 | 1/2012 | McClintock et al. |
| 2001/0003843 | A1 | 6/2001 | Scepanovic et al. |
| 2001/0004588 | A1 | 6/2001 | Hong |
| 2001/0012379 | A1 | 8/2001 | Amemiya et al. |
| 2002/0016189 | A1 | 2/2002 | Sheynblat et al. |
| 2002/0054667 | A1 | 5/2002 | Martinez |
| 2002/0136363 | A1 | 9/2002 | Stumer et al. |
| 2003/0063714 | A1* | 4/2003 | Stumer et al. ................. 379/37 |
| 2003/0109245 | A1 | 6/2003 | McCalmont et al. |
| 2003/0133450 | A1 | 7/2003 | Baum |
| 2003/0158668 | A1 | 8/2003 | Anderson |
| 2004/0072583 | A1 | 4/2004 | Weng |
| 2004/0176123 | A1 | 9/2004 | Chin et al. |
| 2004/0257273 | A1 | 12/2004 | Benco et al. |
| 2005/0002499 | A1 | 1/2005 | Ordille et al. |
| 2005/0003797 | A1* | 1/2005 | Baldwin .................... 455/404.1 |
| 2005/0070315 | A1 | 3/2005 | Rai et al. |
| 2005/0101287 | A1 | 5/2005 | Jin et al. |
| 2005/0111630 | A1 | 5/2005 | Potorny et al. |
| 2005/0123102 | A1 | 6/2005 | Beason et al. |
| 2005/0159132 | A1 | 7/2005 | Wright et al. |
| 2005/0169248 | A1 | 8/2005 | Truesdale et al. |
| 2005/0197096 | A1 | 9/2005 | Yang et al. |
| 2005/0201358 | A1 | 9/2005 | Nelson et al. |
| 2005/0209781 | A1 | 9/2005 | Anderson |
| 2005/0265326 | A1 | 12/2005 | Laliberte |
| 2006/0009190 | A1 | 1/2006 | Laliberte |
| 2006/0043164 | A1 | 3/2006 | Dowling et al. |
| 2006/0052134 | A1 | 3/2006 | Sato |
| 2006/0133582 | A1* | 6/2006 | McCulloch .................... 379/45 |
| 2006/0217136 | A1* | 9/2006 | Bantukul et al. .............. 455/466 |
| 2006/0219542 | A1 | 10/2006 | Savir |
| 2006/0234727 | A1 | 10/2006 | Ashley et al. |
| 2006/0293024 | A1 | 12/2006 | Benco et al. |
| 2007/0003024 | A1 | 1/2007 | Olivier et al. |
| 2007/0201391 | A1* | 8/2007 | Belmonte et al. ............. 370/312 |
| 2007/0273519 | A1 | 11/2007 | Ichikawa et al. |
| 2007/0280428 | A1 | 12/2007 | McClelland |
| 2007/0287473 | A1 | 12/2007 | Dupray |
| 2008/0018452 | A1 | 1/2008 | McCarthy et al. |
| 2008/0026728 | A1 | 1/2008 | Snapp et al. |
| 2008/0057944 | A1 | 3/2008 | Miriyala et al. |
| 2008/0064363 | A1 | 3/2008 | Salafia et al. |
| 2008/0070546 | A1 | 3/2008 | Lee |
| 2008/0144779 | A1 | 6/2008 | Ray et al. |
| 2008/0200143 | A1 | 8/2008 | Qiu et al. |
| 2008/0273670 | A1 | 11/2008 | Dickinson |
| 2008/0304630 | A1 | 12/2008 | Nguyen et al. |
| 2009/0047924 | A1 | 2/2009 | Ray et al. |
| 2009/0086932 | A1 | 4/2009 | Ray |
| 2009/0097474 | A1* | 4/2009 | Ray et al. ...................... 370/352 |
| 2009/0144260 | A1 | 6/2009 | Bennett et al. |
| 2009/0186596 | A1 | 7/2009 | Kaltsukis |
| 2009/0197567 | A1 | 8/2009 | Ogram |
| 2009/0214011 | A1 | 8/2009 | Geldbach et al. |
| 2009/0227225 | A1 | 9/2009 | Mitchell et al. |
| 2009/0310602 | A1 | 12/2009 | Olshansky et al. |
| 2010/0002845 | A1 | 1/2010 | Zerillo et al. |
| 2010/0002846 | A1 | 1/2010 | Ray et al. |
| 2010/0003946 | A1 | 1/2010 | Ray et al. |
| 2010/0003947 | A1 | 1/2010 | Ray et al. |
| 2010/0003949 | A1 | 1/2010 | Ray et al. |
| 2010/0003954 | A1 | 1/2010 | Ray et al. |
| 2010/0003961 | A1 | 1/2010 | Ray et al. |
| 2010/0098062 | A1 | 4/2010 | Croak et al. |
| 2010/0107192 | A1 | 4/2010 | Sennett et al. |
| 2010/0291894 | A1 | 11/2010 | Pipes |
| 2011/0014923 | A1 | 1/2011 | Krco et al. |

OTHER PUBLICATIONS

Response filed Nov. 2, 2010 for U.S. Appl. No. 11/891,784.

Dale N. Hatfield, "A Report on Technical and Operational Issues Impacting the Provision of Wireless Enhanced 911 Services," Federal Communications Commission, printed from the World Wide Web on May 8, 2006 (54 pages).

Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular INK # 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

"AT & T Wireless Unleashes the First and Only Wireless Messaging Device", PhysOrg.com, Sep. 30, 2004; available online at URL: <http://www.physorg.com/news1392.html> (12 pages).

Non-Final Rejection mailed Jan. 19, 2011 for U.S. Appl. No. 11/430,232.

Non-Final Rejection mailed Mar. 17, 2011 for U.S. Appl. No. 11/640,714.

RCE filed on Apr. 4, 2011 for U.S. Appl. No. 11/891,784.

Final Rejection mailed Jan. 3, 2011 for U.S. Appl. No. 11/891,784.

Non-Final Rejection mailed Mar. 4, 2011 for U.S. Appl. No. 12/257,424.

"NENA Recommended Generic Standards for E9-1-1 PSAP Equipment" NENA Technical Reference. NENA-04-001 Issue 2, Mar. 2001.

Non-Final Rejection mailed Mar. 17, 2011 for U.S. Appl. No. 12/257,640.

Non-Final Rejection mailed Apr. 1, 2011 for U.S. Appl. No. 12/257,655.

Non-Final Rejection mailed Mar. 3, 2011 for U.S. Appl. No. 12/257,416.

U.S. Appl. No. 11/430,232; Notice of Allowance dated May 13, 2011; 12 pages.

U.S. Appl. No. 11/430,232; Issue Notification dated Aug. 17, 2011; 1 page.

U.S. Appl. No. 11/640,714; Non-Final Rejection dated Sep. 15, 2011; 15 pages.

U.S. Appl. No. 11/640,714; Final Rejection dated Feb. 29, 2012; 17 pages.

U.S. Appl. No. 11/904,883; Non-Final Rejection dated Oct. 7, 2011; 19 pages.

U.S. Appl. No. 11/904,883; Final Rejection dated Apr. 27, 2012; 16 pages.

U.S. Appl. No. 12/257,424; Non-Final Rejection dated Jan. 31, 2012; 21 pages.

U.S. Appl. No. 12/257,424; Request for Continued Examination and Amendment dated Oct. 14, 2011; 8 pages.

U.S. Appl. No. 12/257,424; Final Rejection dated Jul. 14, 2011; 19 pages.

U.S. Appl. No. 11/974,775; Notice of Allowance dated Apr. 27, 2012; 12 pages.

U.S. Appl. No. 11/974,775; Non-Final Rejection dated Nov. 7, 2011; 19 pages.

U.S. Appl. No. 11/974,775; Non-Final Rejection dated May 10, 2011; 24 pages.

U.S. Appl. No. 12/168,668; Non-Final Rejection dated Feb. 6, 2012; 21 pages.

U.S. Appl. No. 12/070,909; Request for Continued Examination and Amendment dated Mar. 12, 2012; 9 pages.

U.S. Appl. No. 12/070,909; Final Rejection dated Jan. 10, 2012; 9 pages.

U.S. Appl. No. 12/070,909; Non-Final Rejection dated Aug. 16, 2011; 13 pages.

U.S. Appl. No. 12/257,574; Request for Continued Examination and Amendment dated Mar. 29, 2012; 7 pages.

U.S. Appl. No. 12/257,574; Final Rejection dated De. 29, 2011; 18 pages.

U.S. Appl. No. 12/257,574; Non-Final Rejection dated Jul. 6, 2011; 20 pages.

U.S. Appl. No. 12/257.624; Request for Continued Examination and Amendment dated Apr. 30, 2012; 8 page.

U.S. Appl. No. 12/257,624; Final Rejection dated Jan. 31, 2012; 14 pages.

U.S. Appl. No. 12/257,624; Non-Final Rejection dated Oct. 6, 2011; 19 pages.

U.S. Appl. No. 12/257,928; Request for Continued Examination and Amendment dated Feb. 22, 2012; 12 pages.

U.S. Appl. No. 12/257,641; Notice of Allowance dated Feb. 2, 2012; 12 pages.

U.S. Appl. No. 12/257,641; Request for Continued Examination dated Apr. 30, 2012; 2 pages.

U.S. Appl. No. 12/257,641; Non-Final Rejection dated May 24, 2011; 17 pages.

U.S. Appl. No. 12/257,928; Non-Final Rejection dated Jun. 8, 2011; 21 pages.

U.S. Appl. No. 12/257,862; Request for Continued Examination and Amendment dated Feb. 29, 2012; 9 pages.

U.S. Appl. No. 12/257,862; Final Rejection dated Nov. 30, 2011; 15 pages.

U.S. Appl. No. 12/257,862; Non-Final Rejection dated May 24, 2011; 19 pages.

U.S. Appl. No. 11/891,784; Notice of Allowance dated Jul. 18, 2012; 27 pages.

U.S. Appl. No. 11/974,775; Notice of Allowance dated Jun. 12, 2012; 15 pages.

U.S. Appl. No. 12/168,668; Final Rejection dated Jul. 11, 2012; 29 pages.

U.S. Appl. No. 12/257,424; Final Rejection dated Jun. 13, 2012; 41 pages.

U.S. Appl. No. 12/257,641; Notice of Allowance dated Aug. 2, 2012; 17 pages.

* cited by examiner

SYSTEM AND METHOD FOR IDENTIFYING AND COLLECTING DATA MESSAGES BEING COMMUNICATED OVER A COMMUNICATIONS NETWORK

CROSS REFERENCE TO RELATED APPLICATIONS

This Application claims priority to co-pending Provisional Patent Application Ser. No. 61/078,123 filed on Jul. 3, 2008; the entire teachings of which are incorporated herein by reference.

BACKGROUND OF THE INVENTION

Many people, especially young people, use data messaging as a primary means of communication. Data messaging may be in the form of SMS text messaging, email messaging, photo messaging, video messaging, video streaming, and so on. There are various reasons why data messaging is desired to be identified and collected by people other than a user who has sent or received the data message. For example, law enforcement has many reasons for tracking communications of individuals, including but not limited to, monitoring criminal and terrorist activities. Currently, techniques exist for identifying that communications occurred with a user, but the information itself is limited to endpoints of the communications (e.g., mailbox of the user at a service provider's server). In addition, organizations, such as public safety answering points (PSAPs) that maintain communication information may be susceptible to losing the information in the event of a catastrophic failure of equipment. Maintaining backup information locally can often be problematic due to cost, staffing, and spacing restrictions.

SUMMARY

To overcome the problem of not being able to collect content of data messages between users from a network node and organizations having concerns about having local catastrophic equipment failure, the principles of the present invention provide for a network node to be configured to identify and collect a copy of data messages. In one embodiment, the data messages are routed to a computing system of a governmental agency for storage, retrieval, and monitoring.

One method for capturing emergency data messages in a network environment includes receiving, at a first network node, an emergency data message communicated from a wireless communications device. The emergency data message may be accompanied by an origination address and destination address indicative of an emergency network address. A determination may be made at the first network node to determine whether the origination address matches a monitored address established by a law enforcement agency to capture data messages to or from the origination address. If it is determined that the origination address matches the monitored address, then a copy of the emergency data message may be routed to a second network node for collection of the emergency data message and the emergency data message may be routed to the destination address. Otherwise, the emergency data message may be routed to the destination address. The emergency response messages from the PSAP may also be captured and correlated such that a full duplex record of the entire event could be established.

One embodiment of a system for capturing emergency data messages in a network environment may include a memory, an input/output (I/O) unit, and a processing unit in communication with the memory and I/O unit. The processing unit may be configured to receive, at a first network node, an emergency data message communicated from a wireless communications device. The emergency data message may be accompanied by an origination address and destination address indicative of an emergency network address. A determination may be made at the first network node as to whether the origination address matches a monitored address established by a law enforcement agency to capture data messages to or from the monitored address. If the origination address matches a monitored address, then (i) a copy of the emergency data message may be routed to a second network node for collection of the emergency data message, and (ii) the emergency data message may be routed to the destination address. Otherwise, the emergency data message may simply be routed to the destination address. The emergency response messages from PSAP may also be captured and correlated such that a full duplex record of the entire event could be established.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
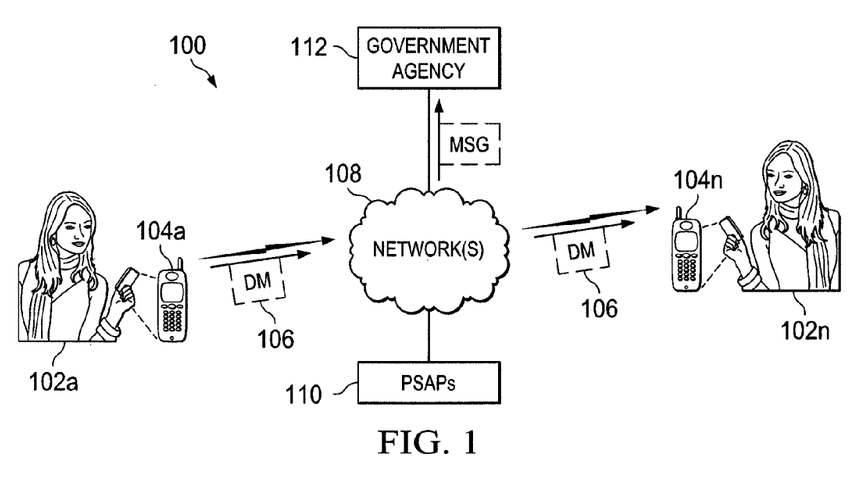
FIG. 1 is an illustration of illustrative network environment in which data messages being communicated over a communications network may be identified and collected.

With regard to FIG. 1, an illustrative network environment 100 is shown to include users 102a-102n (collectively 102) who use wireless communications devices 104a-104n (collectively 104) to communicate data messages between each other. As shown user 102a is communicating a data message 106, such as a text message, instant message, video message, or other message, to user 102n via one or more communications networks 108. In addition to communicating data messages between users, data messages may be communicated to Public Safety Answering Points (PSAPs) 110. As understood, there are roughly 7,000 PSAPs in the United States. Communicating a data message to a PSAP local to a user may be performed by communicating an emergency data message to an Internet domain address, such as "911.911," where a server may determine current location of the user and determine a PSAP that is both local to the user and has communications capabilities for accepting data messages, including the type of data message that is being communicated.

Governmental agencies 112 routinely have an interest in monitoring communications from a user. Historically, telephone communications were monitored. As users now communicate data messages, governmental agencies have a desire and need to collect content of data messages, as well. One such governmental agency is the Federal Bureau of Investigation (FBI). The Communications Assistance for Law Enforcement Act (CALEA) is a United States wiretapping law passed in 1994 to assist governmental agencies and require telecommunications carriers to modify equipment and services to ensure that the governmental agencies have surveillance capabilities. Heretofore, collecting data message communications have been limited. If the governmental agency 112 receives a court approval to monitor communications from user 102a, who may be suspected in being involved with criminal activities, then governmental agency 112 may establish a telephone number or other network address (e.g., email address) of the wireless communications device 104a and stored in a database (not shown) at a communications server (not shown) or other network node on the communications network 108. When the communications server receives data message 106 communicated from the wireless communications device 104a, the data message 106 may be identified and a copy may be generated and routed to the governmental agency 112 for processing.

Figure 2:
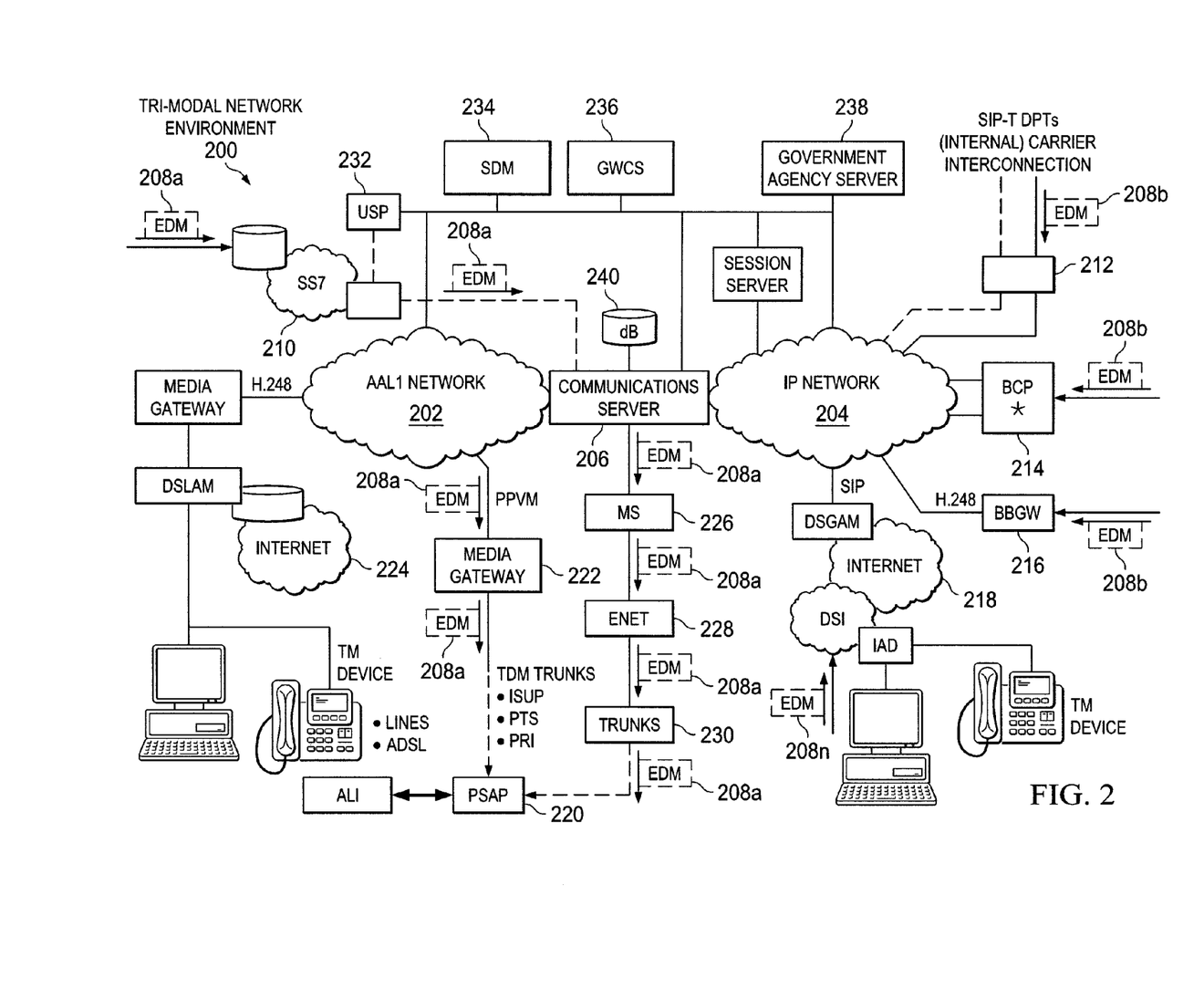
FIG. 2 is a detailed illustration of an illustrative network environment in which emergency data messages are being communicated over a communications network to a PSAP and collected by a communications server.

With regard to FIG. 2, a tri-modal communications network environment 200 is shown. The tri-modal network environment 200 is configured to communicate a variety of different data, including voice, SMS text, and image data. The tri-modal network environment 200 includes an asynchronous transfer mode (ATM) network (ATM Adaptation Layer Type 1 (AAL1)) 202 and an IP network 204. Between the two networks 202 and 204 is a communications server 206, which operates as a cross-connect server to provide communications between the two networks 202 and 204. In one embodiment, the communications server 206 is a Nortel communications server CS 2000.

Emergency data messages (EDMs) 208a-208n (collectively 208) are data messages, such as text messages, email messages, photo messages, video messages, instant messages, or video streaming data, that may be communicated over the ATM network 202 or IP network 204 for routing to a public safety answering point (PSAP) 220. The emergency data messages 208 may enter either of the networks 202 or 204 through a variety of different paths, including an SS7 network 210, session initiation protocol for telephones (SIP-T) via a carrier interconnection 212, border control point 214, broadband gateway 216, Internet 218, or otherwise. As shown, the emergency data message 208a may be routed by the SS7 network 210 to the communications server 206. Depending on the communications capabilities of the PSAP 220, the emergency data message 208a may be routed via (i) the ATM network 202 to a media gateway 222 for communication through the Internet 224 to the PSAP 220, (ii) media server 226, Ethernet 228, and trunks 230 to the PSAP 220, or (iii) direct IP interface and PSAP premise equipment and software capable of directly accepting IP messaging streams, which could be provided with a direct connection of the PSAP 220 with the IP network 204. In one embodiment, if the PSAP 220 is limited to telephone call service, then a text-to-speech system (not shown) may be included in a transmission path for converting content contained in the emergency data message (e.g., text message) into speech for audible play to an operator at the PSAP 220.

The communication server 206 may further be configured to communicate with a number of other systems, including a universal signaling point (USP) 232, security device manager (SDM) 234, gateway controllers (GWCs) 236, government agency server 238, for example. In one embodiment, a communications server database 240 may be configured to store device identification data that is associated with wireless communications devices of users that a government agency, such as the FBI, is monitoring. As each data message, such as emergency data messages 208, is communicated via the communications server 206, the communications server 206 may identify that a data message is being communicated from or to a wireless communications device identified in the communications server database 240 as part of a "watch list." If identified, a copy of the data message and associated communications data may be communicated to the government agency server 238 for storage and processing. The data message may be half or full duplex communications; where half duplex communications are those in which messages flow in a single direction and full-duplex communications are those in which messages flow bi-directionally. Full duplex communication messages may also include messages communicated from a PSAP to a wireless device. These message flows may be intercepted and sent to one or more governmental agency server 238. Watch lists may be utilized to compare with both sending and destination addresses. In addition, a date and time stamp ("time stamp") may be applied to the data message by the communications server 206 and communicated to the government agency server 238. Other information, such as sender and receiver data (e.g., telephone numbers) may be communicated to the government agency server 238, as well.

Figure 3:
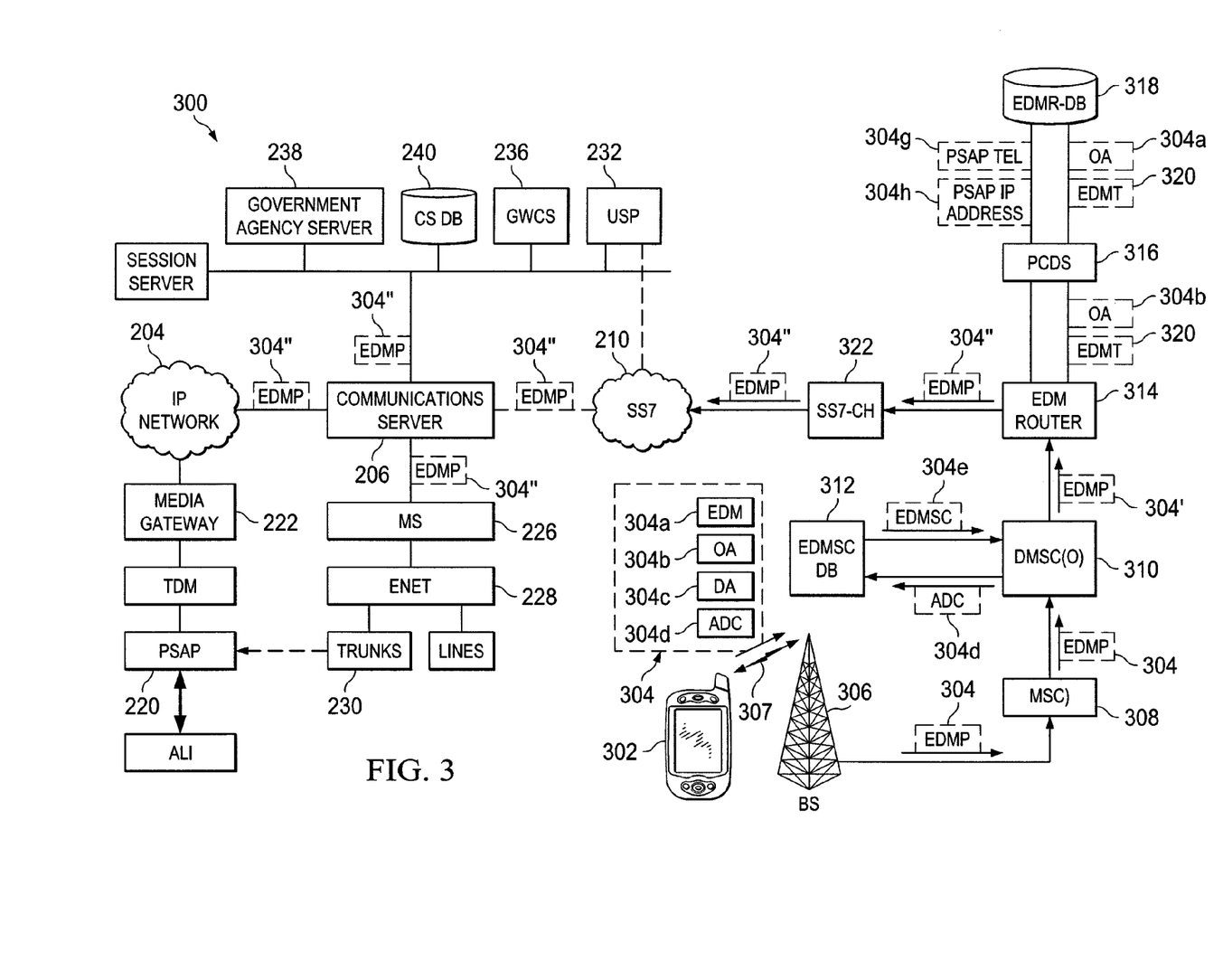
FIG. 3 is an illustration of an alternative embodiment of the illustrative network environment of FIG. 2 including a communications server for identifying and collecting emergency data messages.

With regard to FIG. 3, a wireless communications device 302 configured to communicate data messages may also be configured to communicate emergency data messages. The wireless communications device 302 may be a mobile telephone, personal digital assistant (PDA), wireless gaming device, WiFi telephone, SIP telephone, or any other wireless communications device capable of generating data messages. In one embodiment, the wireless communications device 302 is configured with one or more buttons, either hard or softbuttons, that, when activated by a user, cause the wireless communications device 302 to generate an emergency data message that is addressed to an emergency network location, such as an Internet domain address (e.g., "911.911"), and includes personal information about the user (e.g., name, home address, emergency contact name and phone number, and so on). The personal information may be entered by the user into the wireless communications device 302 so that in the event the user requests to generate and communicate an emergency data message, the personal information is available to populate pre-established or preformatted data fields in the emergency data message. Alternatively, an emergency data message may be a freeform data message that is addressed to an emergency network address.

The wireless communications device 302 may communicate an emergency data message package (EDMP) 304 to base station 306 via a wireless communications link 307. The EDMP 304 may include a message portion 304a, origination address 304b (e.g., telephone number, mobile directory number (MDN), mobile identifier (MID)) of the wireless communications device 302, destination address 304c (e.g., telephone number, network address), abbreviated dialing code 304d (e.g., "SOS," "911"), and any other information that may be used for identification and routing purposes.

The abbreviated dialing code 308b may be established by a service provider and/or manufacturer of the wireless communications device 304. The abbreviated dialing code 304d may essentially be any code, typically a ten digit code, that indicates that an emergency data message is being communicated from the wireless communications device 302. As an analogy, on the voice network there are many different types of abbreviated dialing codes, including "411" for placing an information call to a service provider, "911" for placing an emergency telephone call, and so on. As an example, an abbreviated dialing code for indicating that an emergency data message is being communicated may be "0000000SOS." Alternatively, if different types of emergency data messages are available for selection using a menu system on the wireless communications device 302, then different abbreviated dialing codes may also be selectively communicated to represent the selected emergency data message that is being sent. For example, the abbreviated dialing codes may include "000000SOS1," "000000SOS2," "000000SOS3," and so on to indicate different types of emergencies and certain content in the emergency data messages. The different types of emergencies may include medical condition, automobile accident, fire, assault, or any other type of emergency data message that may be helpful to an operator at a PSAP for dispatching emergency personnel. Specific abbreviated dialing codes sent in the EDMP 304 can automatically trigger generating a copy of the message and routing the copied message to one or more governmental agency 112 for processing. For example, a felony hostage situation may automatically generate a copy to the FBI and/or other local authorities.

If the EDMP 304 includes an image (e.g., photograph or video), then image data may be included in addition to text. If the message portion 304 is pre-established to include certain data fields, then those data fields may be populated with information associated with the user (e.g., name, home address, work address) and indicative of the type of emergency (e.g., "emergency," "fire," "auto accident," "shooting," "health emergency," etc.) that the user is experiencing.

The EDMP 304 may be communicated to the mobile switching center (MSC) 308. The MSC 308 may route the EDMP 304 to an originator data message service controller (DMSC(O)) 310. The DMSC(O) 310 may be in communication with an emergency data message short code database (EDMSC-DB) 312, which may include a listing (see TABLE I) of abbreviated dialing codes and short codes associated therewith so as to return an emergency data message short code (EDMSC) 304e to the DMSC(O) 310 that is indicative of the type of emergency data message (e.g., "medical condition"). The emergency data message short code may be alphanumeric data and utilized by other nodes in the network environment 300 for prioritizing processing of the emergency data message 304a (e.g., text message). The cell code is a data value associated with a cell of a mobile communications system and is typically determined by the mobile switching center 308 by determining to which cell tower the wireless communications device 302 is communicating.

TABLE I

| ADC | EDM Short Code | TYPE |
| --- | --- | --- |
| SOS0 | EMERGENCY0 | Default |
| SOS1 | EMERGENCY1 | Medical |
| SOS2 | EMERGENCY2 | Automobile Accident |
| SOS3 | EMERGENCY3 | Fire |
| SOS4 | EMERGENCY4 | Assault |

The DMSC(O) 310, in response to receiving the EDMSC 304e may route the EDMP 304', which may now include the EDM 304a, origination address 304b, destination address 304c, and EDMSC 304e, to an emergency data message router 314. In one embodiment, the emergency data message router 314 is located at the destination address 304c to which the emergency data message 304a is being sent. The emergency data message router 314 may be configured to route emergency data messages to a PSAP local to the user of the wireless communications device 302 that is configured with communications capabilities for receiving the emergency data message 304a. In determining a network address (e.g., telephone number or Internet address) of a PSAP, the emergency data message router 314 may request the network address from a PSAP capabilities defining system (PCDS) 316, which may be a server configured to determine a PSAP local to the user and having communications capabilities that enable receiving the emergency data message 304a.

More specifically, in determining local PSAPs, the PCDS 316 may receive the origination address 304b and cell code (not shown), which is typically determined by the MSC 308, to determine whether there is a PSAP local to the exchange code of the wireless communications device 304 by matching a three-digit exchange code of the origination address 304b, if the origination address 304b is a telephone number of the wireless communications device 302, and exchange code associated with one or more PSAP. However, because the wireless communications device 302 is mobile and may be utilized outside the exchange area in which the wireless communications device 302 is initially registered, the PCDS 316 may or may not use the origination address 304b in determining a local PSAP to the wireless communications device 302. For example, if the exchange code digits of the origination address 304b are foreign to an area in which the wireless communications device 302 is operating, then the PCDS 316 may be limited to using the cell code to determine PSAPs that are local to the wireless communications device 302. A combination of both the cell code and origination address 304b may be used to determine local PSAPs. Alternatively, a determination may be made on information provided as part of the message including geo-coordinates (e.g., GPS coordinates) of the sending device and geo-coordinates of the PSAPs using a mathematical vector algorithm or equivalent database query to determine the nearest emergency service provider as per the emergency type.

An emergency data message router database (EDMR DB) 318 may be in communication with the PCDS 316 to enable the PCDS 316 to look up PSAPs that are (i) local to the wireless communications device 302 and (ii) have particular communications capabilities. The emergency data message router database 318 may be local to or remotely located from the PCDS 316. The emergency data message router database 318 may store information associated with each of the nearly 7,000 PSAPs in the United States, including network address (e.g., telephone number and/or IP address), communications capabilities, geographic location, geographic serving area, and so on. The communications capabilities of the PSAPs may include the ability to receive text messages, instant messages, e-mails, photo messages, or video messages, as understood in the art. In determining the communications capabilities, the PCDS 316 and/or EDMR DB 318 may determine an address associated with a local PSAP, and the communications capabilities may be identified by the type of address (e.g., telephone number or IP address) or position of the address within the EDMR DB 318.

With each of these communications capabilities, the PSAPs have access to communications network(s) that are capable of communicating compatible emergency data messages of those types. It should be understood that the PCDS 316 and process being executed thereby may identify the type of emergency data message 304a that is being communicated and determine which PSAP local to the wireless communications device 302 is capable of receiving that type of emergency data message. For example, if the emergency data message 302a is a text message, then a PSAP that is both local to the user and has capabilities of receiving emergency text messages may be determined to be most compatible with the emergency data message that is being communicated to request emergency assistance.

Although a PSAP that is closest to the user may be considered ideal from an emergency personnel deployment perspective, many PSAPs are not equipped to handle certain types of communications, so the PCDS 316 may determine whether any PSAPs local to the user are compatible with the emergency data message 304a that is being communicated before selecting the PSAP to route the emergency data message 304a. In other words, an emergency data message sent in its original form may be best to provide to a PSAP in that same form to avoid loss of data, corruption of the data, or misinterpretation by a PSAP operator. Any translations that may be performed to convert from one format to another are lossless; meaning there is no loss of any message information.

To determine whether a PSAP has compatible communications, the emergency data message router 314 may determine, by examining a packet header or other data field(s), generate, and communicate an emergency data message type (EDMT) 320, which may be an alphanumeric value and is indicative of the type of emergency data being communicated (e.g., text, image, instant message, email). The PCDS 316 may use and/or communicate the EDMT 320 to the emergency data message router database 318 to identify any PSAPs local to the user that have communications capabilities that are compatible with the type of emergency data message 304a being communicated. If, for example, it is determined by the PCDS 316 that there are no PSAPs local to the user of the wireless communications device 302 that are compatible with receiving text messages based on the EDMT 320, then the PCDS 316 may determine that an emergency text message may be communicated to a local PSAP by sending the PSAP to a text-to-speech translator for converting the text-to-speech for audible communication to the local PSAP. The emergency data message router database 318, in response to locating a local PSAP with the most compatible communications capabilities, may return a PSAP telephone number 304f or PSAP IP address 304g, depending on the communications network that is available to communicate the type of emergency data message received from the wireless communications device 302. The PSAP telephone number 308f may be used for a text message or image message to be communicated to the PSAP and the PSAP IP address 308g may be used for communicating an email to the PSAP, for example. Other types of message translations may be employed as available. The returned PSAP telephone number 308f and/or PSAP IP address 304g would be sent to the government agency 112.

The emergency data message router database 318 may include a database or table that stores and manages, and/or also performs algorithm calculations to arrive at, PSAP cell codes, capabilities, and network addresses so that the PCDS 316 may select an appropriate PSAP to communicate the emergency data message based on a number of factors. The factors may include distance from the user, type of emergency data message, network connection, which may be indicated by whether a network address is available, geographic coordinates, and so forth. An illustrative listing of a table that may be managed and operated by the emergency data message router database 318 is shown in TABLE II below.

TABLE II

| PSAP | PSAP Cell Code | Exchange Codes | Capabilities | Network Addresses | | |
|---|---|---|---|---|---|---|
| | | | | Voice (PSTN) | Text/Image (Mobile Network) | Email (IP Address) |
| Easton | 3719 | 405 | Voice | 972-405-1234 | — | — |
| Weston | 3720 | 826, 259 | Voice, Text | 972-826-1234 | 972-259-9876 | — |
| Central 1 | 3721, 3729 | 408 | Voice | 214-408-9876 | — | — |
| Central 2 | 3721, 3730 | 528, 526 | Voice, Text | 214-528-1234 | 214-526-5555 | — |
| Central 3 | 3721, 3729 | 528, 259 | Voice, Text, Image, Email | 214-528-5678 | 214-259-5555 | 127.37.17.38 |
| South 1 | 3722, 3741 | 699 | Voice | 817-699-1234 | — | — |
| South 2 | 3722, 3733 | 347, 283 | Voice, Text | 817-347-1234 | 817-283-5555 | — |
| North | 3723 | 277, 623 | Voice, Text, Image, Email | 972-277-1234 | 972-623-5555 | 128.94.1.23 |

In one embodiment, the selected PSAP is positioned on a network such that the emergency data message package 304", which includes the PSAP telephone number 304g or PSAP IP address 304h, is communicated via an SS7 clearinghouse (CH) 322 and SS7 network 204 to the communications server 206, which may operate as a terminating data message service controller (DMSC(m)). The EDM router 314, PCDS 316, EDMR DB 318 or combination thereof may route or reformat, re-address, and/or route the emergency data message 304a. If a determination is made that a PSAP does not have a compatible communications capability as an emergency data message, then the emergency content of the emergency data message may be reformatted, re-addressed, and re-routed. If the emergency data message type matches the communications capabilities of a selected local PSAP, then the emergency data message 304a may be routed accordingly.

The communications server 206 may be configured to identify data messages, such as emergency data messages, having an origination or destination address that one or more governmental agency wants to monitor. As understood in the art, the communications server 206 may includes conventional internal components, including a processing unit, memory, input/output unit, storage unit and other components typical of a computer. The processing unit may execute software that compares the origination and destination addresses to addresses identified by the governmental agency. A database local to the communications server 206, which may be stored in memory or on the storage unit, may include a list of addresses that the governmental agency is seeking to collect data messages. The list of addresses may include telephone numbers, IP addresses, mobile electronic identifiers, or any other identifier indicative of a communications device, either wired or wireless, that communicates data messages over communications network(s). The list of addresses may be generated at the governmental agency server 238 and communicated to the communications server 206 operating on the SS7 network 204 for storage thereat so as to monitor for those addresses. In one embodiment, the governmental agency is a manager of the PSAP 220 that wants to collect each data message communicated to or from the PSAP 220 for backup purposes. By using the communications server 206 to collect data messages, law enforcement is able to inspect contents of the emergency data message 304a by the communications server 206 communicating the EDMP 304" to the governmental agency server 238.

While the network environment 300 of FIG. 3 illustrates collecting an emergency data message 304a from a wireless communications device 302, it should be understood that the communications server 302 may collect non-emergency data messages. Positioning the communications server 206 between the SS7 network 210, IP network 204, and ATM network 202 enables a significant number of data messages to be processed to identify and collect desired data messages for governmental agencies. It should further be understood that the communications server 302 is illustrative and that the communications server 302 may be positioned elsewhere within the network environment 300. In addition, rather than being a single communications server, multiple communications servers may be in communication with the governmental agency server and perform the same or similar function in identifying and routing copies of data messages, including emergency and non-emergency data messages.

Figure 4:
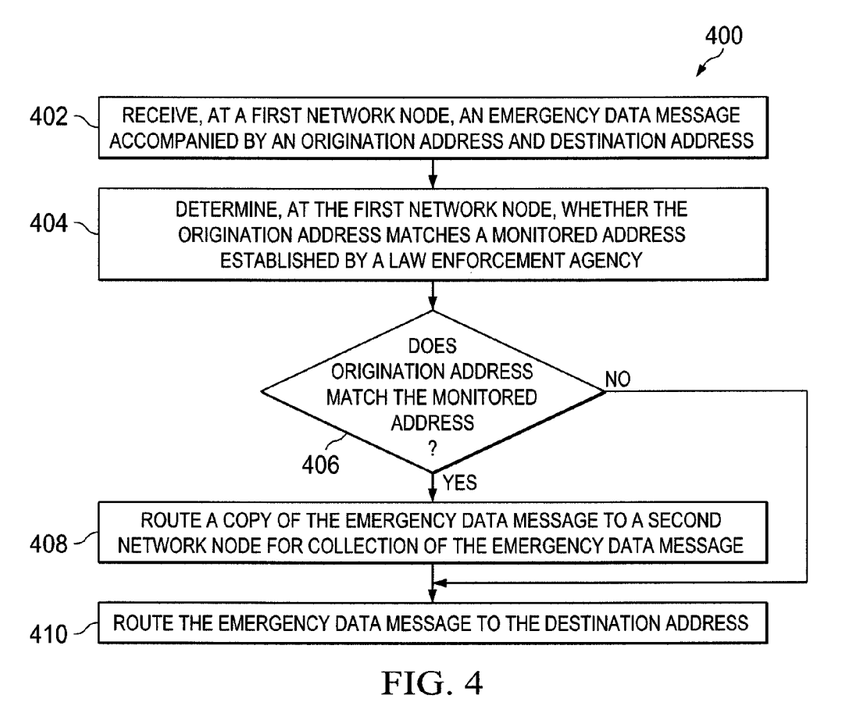
FIG. 4 is a flow diagram of an illustrative process for identifying and collecting emergency data messages.

With regard to FIG. 4, an illustrative process 400 may be provided for a first network node may receive an emergency data message communicated from a wireless communications device at step 402. In one embodiment, the first network node is a communications server. The emergency data message may be accompanied by an origination address and destination address indicative of an emergency network address. At step 404, a determination at the first network node may be made as to whether the origination address matches a monitored address established by a law enforcement agency to capture data messages to or from the monitored address. If it is determined at step 406 that the origination address matches the monitored address, then at step 408, a copy of the emergency data message may be routed to a second network node for collection of the emergency data message in addition to routing the emergency data message to the destination address at step 410. Otherwise, the emergency data message is routed to the destination address at step 410 without sending a copy to the second network node. In one embodiment, the second network node is a governmental agency server.

Although the principles of the present have primarily been described with regard to wireless communications devices, it should be understood that wired communications devices, including wired/wireless computers, may be adapted to include emergency messaging, as described herein. One or more buttons or other initiation devices may be provided on the wired communications devices to generate and communicate an emergency data message to a network location for routing to a PSAP local to the user. In adapting the wired communications devices, software may be included in the devices to generate and communicate an emergency data message (e.g., text message or email) using a communications protocol that is capable of being communicated over the communications network (e.g., public switched telephone network, cable network, Internet), as understood in the art. Information specific to the user, location of the user, or otherwise may be included in the emergency data message. For example, name, address, number of people in residence, photograph, medical conditions, or any other information may be pre-established for retrieval and inclusion in the emergency data message, thereby providing information to an operator at a PSAP to provide emergency personnel, such as police, firemen, or medical personnel.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

We claim:

1. A method for capturing emergency data messages in a network environment, said method comprising:
   receiving, at a first network node, an emergency data message communicated from a wireless communications device, the emergency data message being accompanied by an origination address and destination address indicative of an emergency network address, the emergency network address being that of a public safety answering point (PSAP);
   determining, at the first network node, whether the origination address matches a monitored address established by a law enforcement agency to capture data messages to or from the monitored address; and
   if the origination address matches the monitored address:
      routing a copy of the emergency data message to a second network node for collection of the emergency data message; and
      routing the emergency data message to the destination address;
   otherwise, routing the emergency data message to the destination address.

2. The method according to claim 1, further comprising:
   receiving, at the first network node, an emergency data message response from the PSAP having a destination address for the wireless communications device;
   determining that the destination address matches the monitored address; and
   in response to determining that the destination address matches the monitored address:
      routing a copy of the emergency data message response to the second network node; and
      routing the emergency data message response to the wireless communications device.

3. The method according to claim 1, wherein receiving the emergency data message at the first network node includes receiving the emergency data message at a switching gateway operating on the communications network and in communication with the second network node, which is a server operated by the law enforcement agency.

4. The method according to claim 1, wherein receiving an emergency data message includes receiving a text message.

5. The method according to claim 1, wherein receiving a destination address includes receiving an Internet domain name address.

6. The method according to claim 1, further comprising routing the emergency data message via an ATM network to the PSAP.

7. The method according to claim 1 further comprising, in response to receiving the emergency data message:
   time stamping the emergency data message; and
   communicating the time stamp to the second network node.

8. The method according to claim 1, wherein receiving an emergency data message further includes receiving a short code with the emergency data message; and
   further comprising prioritizing the emergency data message ahead of non-emergency data messages based on the short code.

9. A system for capturing emergency data messages in a network environment, said system comprising:
   a memory;
   an input/output (I/O) unit;

a processing unit in communication with said memory and I/O unit, and configured to:
  receive, at a first network node, an emergency data message communicated from a wireless communications device, the emergency data message being accompanied by an origination address and destination address indicative of an emergency network address, the emergency network address being that of a public safety answering point (PSAP);
  determine, at the first network node, whether the origination address matches a monitored address established by a law enforcement agency to capture data messages to or from the monitored address; and
  if the origination address matches the monitored address:
    route a copy of the emergency data message to a second network node for collection of the emergency data message; and
    route the emergency data message to the destination address;
  otherwise, route the emergency data message to the destination address.

10. The system according to claim 9, wherein said processing unit is further configured to:
  receive, at the first network node, an emergency data message response from the PSAP having a destination address for the wireless communications device;
  determine that the destination address matches the monitored address; and
  in response to determining that the destination address matches the monitored address:
    route a copy of the emergency data message response to the second network node; and
    route the emergency data message response to the wireless communications device.

11. The system according to claim 9, wherein said processing unit is being operated by a switching gateway operating on the communications network and in communication with the second network node, which is a server operated by the law enforcement agency.

12. The system according to claim 9, wherein the emergency data message is a text message.

13. The system according to claim 9, wherein the destination address is an Internet domain name address.

14. The system according to claim 9, wherein said processing unit is further configured to route the emergency data message via an ATM network to the PSAP.

15. The system according to claim 9, wherein said processing unit is further configured to, in response to receiving the emergency data message:
  time stamp the emergency data message; and
  communicate the time stamp to the second network node.

16. The system according to claim 11, wherein said processing unit is further configured to receive a short code with the emergency data message and, based on the short code, prioritize the emergency data message ahead of non-emergency data messages.

17. A method for capturing data messages in a network environment, said method comprising:
  receiving, at a first network node, a data message communicated from a wireless communications device, the data message being accompanied by an origination address and destination address indicative of an emergency network address, the emergency network address being that of a public safety answering point (PSAP);
  determining, at the first network node, whether the origination address matches a monitored address established by a law enforcement agency to capture data messages to or from the monitored address; and
  if the origination address matches the monitored address:
    routing a copy of the data message to a second network node for collection of the data message; and
    routing the data message to the destination address;
    otherwise, routing the data message to the destination address.

18. The method according to claim 17, wherein receiving the data message includes receiving a text message.

19. The method according to claim 17, wherein routing the data message to the destination address includes routing the data message to a destination address associated with another wireless communications device.

20. The method according to claim 17, further comprising time stamping the data message and communicating the time stamp with the data message to the second network node.

* * * * *